United States Patent [19]

Torre et al.

[11] Patent Number: 4,980,206
[45] Date of Patent: Dec. 25, 1990

[54] METHOD FOR IMPROVING ATOMIC OXYGEN RESISTANCE

[75] Inventors: Larry P. Torre, Renton; Bruce L. Zornes, Jr., Bothell, both of Wash.

[73] Assignee: The Boeing Company, Seattle, Wash.

[21] Appl. No.: 224,259

[22] Filed: Jul. 25, 1988

Related U.S. Application Data

[63] Continuation of Ser. No. 907,950, Sep. 15, 1986, abandoned.

[51] Int. Cl.$^5$ .................................... B05D 3/02
[52] U.S. Cl. ......................... 427/385.5; 244/158 R; 427/387; 428/411.1; 428/447
[58] Field of Search .......... 244/117 A, 158 A, 158 R; 427/387, 385.5; 428/447, 411.1

[56] References Cited

U.S. PATENT DOCUMENTS

| | | | |
|---|---|---|---|
| 3,661,833 | 5/1972 | Larson | 524/588 |
| 4,024,306 | 5/1977 | Takamizawa et al. | 528/42 |
| 4,389,504 | 6/1983 | St. Clair et al. | 525/474 X |
| 4,492,786 | 1/1985 | Evans et al. | 524/588 |
| 4,549,004 | 10/1985 | von Au et al. | 528/42 |
| 4,624,888 | 11/1986 | St. Clair et al. | 428/447 X |

Primary Examiner—Michael Lusigman
Attorney, Agent, or Firm—John C. Hammar

[57] ABSTRACT

Filled fluorosilicone and filled fluorophosphazene composite films and unfilled fluorosilicone, fluorophosphazene, or copolymers provide atomic oxygen resistance to protect surfaces on spacecraft in low earth orbit. The preferred composite films are generally made by polymerizing suitable precursors on the exposed surfaces, the filler being mixed with the polymer precursors prior to curing. Second surface mirrors can be protected with these films while the flexibility of the mirror is retained.

23 Claims, 1 Drawing Sheet

METHOD FOR IMPROVING ATOMIC OXYGEN RESISTANCE

REFERENCE TO RELATED APPLICATIONS

The present application is a continuation application of 06/907,950, filed Sept. 15, 1986, now abandoned.

TECHNICAL FIELD

Thermal control coatings improve the resistance of exposed surfaces on spacecraft or satellites in low earth orbit to degradation by atomic oxygen and/or UV radiation. The coatings include fluorosilicones or fluorophosphazenes.

BACKGROUND ART

A critical need has arisen to develop better thermal control coatings so that the spacecraft will be better able to withstand degradation by atomic oxygen or UV radiation. While conventional thermal control pigments or coatings (e.g., polyurethanes, polyimides, or other hydrocarbons) are generally suitable for short duration shuttle flights, for high orbits, or for interplanetary exploration, the conditions of low-earth orbit where atomic oxygen is particularly prevalent (within 200 to 900 kilometers of the surface) require that a superior coating be developed. NASA flight data has shown that fluorocarbons and silicones have high, intrinsic, atomic oxygen resistance, but the optimal coating remains uncertain as research intensifies on the Space Station.

SUMMARY OF THE INVENTION

The present invention relates to a novel thermal control polymeric coating or composite for improving the resistance of exposed surfaces, such as polyimides or graphite/epoxy composites, to degradation by atomic oxygen and/or by UV radiation. The polymer for the coating is selected from the group consisting of fluorosilicones or fluorophosphazenes. Typically, pigmented coatings are prepared by mixing a fine powder (no larger than 200 ANSI mesh) of a suitable filler with a suitable solvent, blending of the powder-solvent mixture with polymer precursors to form a viscous fluid, applying the fluid to the surface to form a film, and curing the polymer precursors to form a "composite" coating of the filled polymer. The composite usually consists of between about 50–90% powder or filler with the remainder being a binding amount of the polymer. In some cases, the filler can be mixed directly with the polymer precursors, thereby eliminating the need for a solvent. Alternatively, an already cured fluorophosphazene or fluorosilicone thermal control sheet or film might be bonded to a surface rather than cured after being spread on the surface. Clear coatings that are not filled can be prepared in a similar way. These clear films or coatings are particularly desirable for applying to reflective surfaces to make flexible second surface mirrors that are resistant to atomic oxygen.

BEST MODE CONTEMPLATED FOR MAKING AND USING THE INVENTIONS

Figure 1:
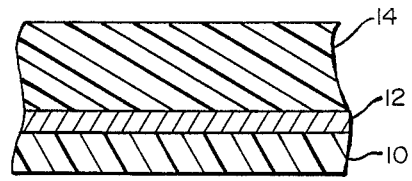
FIG. 1 is a schematic cross-sectional view of a flexible second surface mirror of the present invention.

Filled fluorosilicone or fluorophosphazene thermal control coatings suitable for improving the resistance of a composite or polymer surface to atomic oxygen degradation and/or UV radiation degradation, particularly for spacecraft in low earth orbits (200–900 km), include a major portion of a filler and a binding amount of a polymer to form a relatively thin film coating on the surface, so that the resistance is gained with only a small weight (mass) penalty.

The filler is generally selected from the group consisting of zinc oxide, barium fluorosilicate, zinc orthotitanate, barium silicate, aluminum oxide, zirconium fluorosilicate, titanium oxide (titania), zirconium silicate, silica, zirconium oxide, silicon nitride, magnesium oxide, zinc fluorosilicate, magnesium fluorosilicate, zinc silicate, barium orthotitanate, aluminum fluorosilicate, zirconium orthotitanate aluminum silicate, aluminum orthotitanate, or mixtures thereof, and preferably, is zinc oxide, zinc orthotitanate, or mixtures thereof. The fillers provide white films that are resistant to atomic oxygen. Zinc oxide and zinc orthotitanate, perhaps, offer the best optical properties.

The fluorosilicone binder is prepared from polymer, oligomer, or monomer precursors that produce compounds of the general formula:

$$X\text{---}\left[\begin{array}{c}R_1\\|\\\text{Si---O}\\|\\R_2\end{array}\right]_a\text{---}X$$

wherein
$R_1$ and $R_2$ are —$CH_3$, —F, —$CF_3$,
—$CH_2$-$(CH_2)_n$-$CH_3$,
—$CH_2$-$(CH_2)_n$-$CF_3$,
—$CH_2$-$(CF_2)_n$-$CF_3$,
—$C_2H_4$-$(CF_2)_e$-$CF_mH_{3-m}$,
—$CH$-$(CF_3)_2$, —$C$-$(CF_3)_3$, or

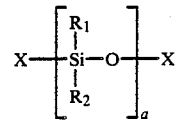

$a \times $ about 10–1000;
$b \times $ 0–5;
$n \times $ 0–10;

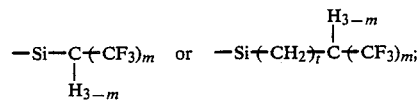

$m \times $ 0–3;
$t \times $ 0–6; and
$e \times $ 0–20.

Suitable space-grade precursors are commercially available from Dow-Corning, General Electric, and others. The finished films can be formed (after applying the precursors to the surface) by curing the precursors by heat-induced or chemical polymerization. Polymerization initiators, such as organic peroxide free radical initiators, organometallics (like tin octoborate), oxime catalysts, or platinum salts, can be used in the chemical polymerization.

The fluorophosphazene binder is prepared from polymer, oligomer, or monomer precursors that produce compounds of the general formula:

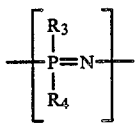

wherein $R_3$ and $R_4 X = -(-CH_2)_k(CF_2)_j CF_m H_{3-m}$;

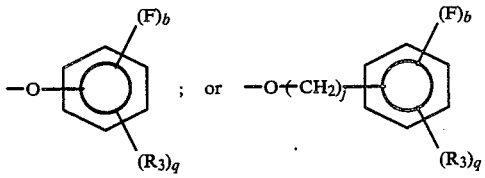

$k \times 0-10$;
$i \times 0-10$;
$m \times 0-3$;
$j \times 1-5$;
$b \times 0-5$; and
$q \times 0$ through (5-b).

These fluorophosphazenes have conventional, nonreactive, chain terminating groups, as are known in the art. Suitable precursors or formulated polymer gums are available from the Ethyl Corporation. The finished films can be formed (after applying the precursors to the surface) by curing the precursors by heat-induced or chemical polymerization. Polymerization initiators, such as organic peroxide free radical initiators or other compounds previously identified, are typically used in the chemical polymerization, in a manner analogous to the fluorosilicones.

Generally, the filler comprises a fine powder having a grain size less than about 200 ANSI mesh. The filler comprises about 50–90% of the film with as little fluorosilicone or fluorophosphazene polymer as possible, but sufficient polymer to bind the powder together and to the surface to be protected.

A mixture of the filler and a suitable solvent (such as toluene, hexane, benzene, acetone, or methyl ethyl ketone) is prepared and the polymeric precursors are added to form a viscous fluid. This fluid is deposited under in inert (nitrogen) atmosphere in a thin layer on the exposed surface by any standard procedure, such as by brushing, dipping, spraying, or sputtering. The coating is cured by heating the layer or by using chemical polymerization initiators (which were originally added to the filler-solvent mixture).

Copolymers are also suitable coatings, and comprise, preferably, a blend of the fluorosilicones and fluorophosphazenes that are suitable to use separately. These films are made from a co-mixture of the precursors that are co-cured. Other fluorocarbons or other polymers might also be used in the copolymers, if such polymers are compatible with the fluorosilicones and/or fluorophosphazenes and have compatible curing capability.

The properties of the coating can be easily controlled by selection of the precursors and fillers, by control of their relative concentrations, by control of the degree of crosslinking, and to some extent by the mix of the fluorosilicones and fluorophosphazenes. All the coatings exhibit resistance to atomic oxygen degradation, resistance to UV radiation degradation, flexibility, and low outgassing, which are desirable properties for thermal control coatings for spacecraft in low earth orbits.

The polymers can be linear, branched, or crosslinked, although a moderately to highly crosslinked structure is preferred. Controlling the degree of cure and crosslinking regulates the physical and mechanical properties of the coatings. Tough, flexible, and abrasion resistant coatings are preferred.

While the preferred thermal control coatings are flexible and white (as obtained with fluorosilicones and fluorophosphazenes filled with zinc oxide or zinc orthotitanate), the coatings can also include other inorganic salts or inorganic oxides to produce colored coatings. Clear or unfilled films may also be used to form flexible second surface mirrors.

The coatings of the present invention, accordingly, provide flexible and durable protection against atomic oxygen degradation. Conventional thermal control coatings or KAPTON polyimide films suffer large weight losses (atomic oxygen oxidation) even on relatively short exposures to atomic oxygen, as on Space Shuttle missions. NASA tests identified metallized fluorocarbons, (such as FEP and Teflon), filled silicones, and inorganic oxides, (such as zinc oxide or titania) as being resistant to atomic oxygen degradation. The fluorocarbons were suitable for flexible second surface mirrors that are used for thermal control while the filled silicones were suitable for white diffuse thermal control coatings. The present invention suggests improved coatings that furnish superior properties in terms of low earth orbit (LEO) environmental resistance. Preliminary evaluation has shown that fluorosilicone and fluorophosphazene films and filled composites have very low average % wt. loss on extended exposure to atomic oxygen and are at least as good as the silicones or fluorocarbons.

Figure 2:
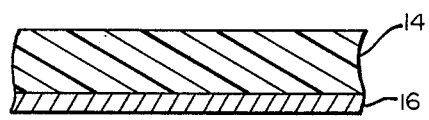
FIG. 2 is another schematic cross-sectional view, similar to FIG. 1, of another second surface mirror.

A flexible second surface mirror can readily be made on aluminized or silver MYLAR or other film (such as teflon or KAPTON by coating the metallized surface with a thin film of the fluorophosphazene, fluorosilicone or fluorosilicone- fluorophosphazene copolymer. As shown in FIG. 1, the resulting article is a multilayer sandwich having the MYLAR or polymeric backing 10, metallization 12, and the clear protective coating 14. Alternatively, as shown in FIG. 2, the mirror can be made in two layers by applying metallization 16 to one surface of a fluorosilicone, silicone, fluorophosphazene, or fluorosilicone-fluorophosphazene copolymer. Any conventional metallization process can be used, such as dc magnetron sputtering. Silver or silver/Inconel metallization is preferred. The mirrors made in accordance with the method of the present invention probably will have superior mechanical properties over those correctly being made with FEP. The protective coating may be on both surfaces of the mirror adjacent, on one side, to the metallization (as shown in FIG. 2) and, on the other side, to the backing, thereby making a four-layered structure.

While preferred embodiments have been described, those skilled in the art will recognize modifications, alterations, or variations that can be made to the described embodiments without departing from the inventive concept. Therefore, the description is meant to illustrate the invention rather than to limit it. The claims should be interpreted liberally to protect the embodiments and their reasonable equivalents, and should only be limited as is necessary in view of the pertinent prior art.

We claim:

1. A method for improving the resistance of exposed surfaces to degradation by atomic oxygen or by UV radiation, especially useful for protecting spacecraft in low earth orbit, comprising the step of:
   (a) depositing a thermal control polymeric coating on the surface, for protecting the surface from atomic oxygen degradation, the polymer being selected from the group consisting of fluorosilicones, fluorophosphazenes, or mixtures thereof; and
   (b) exposing the coating to low earth orbit conditions.

2. The method of claim 1 wherein the coating includes a filler.

3. The method of claim 1 wherein the coating is a co-mixture of fluorophosphazene and fluorosilicone that is co-cured.

4. The method of claim 2 wherein the coating is a fluorosilicone

5. The method of claim 4 wherein the fluorosilicone is selected from the group consisting of:

$$X-\left[\begin{array}{c}R_1\\|\\Si-O\\|\\R_2\end{array}\right]_a-X$$

wherein
$R_1$ and $R_2$ are —$CH_3$, —F, —$CF_3$,
—$CH_2(CH_2)_n CH_3$,
—$CH_2(CF_2)_n CF_3$,
—$CH_2(CH_2)_n CF_3$, —CH—$(CF_3)_2$,
—$C_2H_4(CF_2)_e CF_m H_{3-ml}$,
—$C(CF_3)_3$,

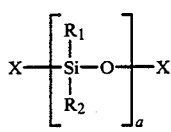

or

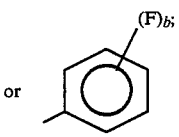

a×about 10–1000;
m×0–10;
b×0–5;
X×

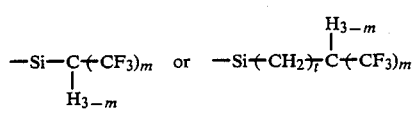

m×0–3;
t×0–6; and
e×0–20 provided that the fluorosilicone includes fluorine.

6. The method of claim 2 wherein the coating is a fluorophosphazene.

7. The method of claim 6 wherein the fluorophosphazene is selected from the group consisting of:

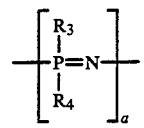

$R_3$ and $R_4 \times -\!\!+\!\!O\!-\!CH_2)_k (CF_2)_i CF_m H_{3-m}$,

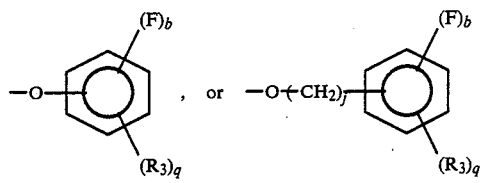

wherein
k×0–10;
i×0–10;
m×0–3;
j×1–5;
b×0–5; and
q×0 through (5-b).

8. The method of claim 2 wherein the filler is selected from the group consisting of zinc oxide, barium fluorosilicate, zinc orthotitanate, barium silicate, aluminum oxide, zirconium fluorosilicate, titanium oxide, zirconium silicate, silica, zirconium oxide, silicon nitride, magnesium oxide, zinc fluorosilicate, magnesium fluorosilicate, zinc silicate, barium orthotitanate, aluminum fluorosilicate, zirconium orthotitanate, aluminum silicate, aluminum orthotitanate, and mixtures thereof.

9. The method of claim 5 wherein the filler is selected from the group consisting of zinc oxide, barium fluorosilicate, zinc orthotitanate, barium silicate, aluminum oxide, zirconium fluorosilicate, titanium oxide, zirconium silicate, silica, zirconium oxide, silicon nitride, magnesium oxide, zinc fluorosilicate, magnesium fluorosilicate, zinc silicate, barium orthotitanate, aluminum fluorosilicate, zirconium orthotitanate, aluminum silicate, aluminum orthotitanate, and mixtures thereof.

10. The method of claim 7 wherein the filler is selected from the group consisting of zinc oxide, barium fluorosilicate, zinc orthotitanate, barium silicate, aluminum oxide, zirconium fluorosilicate, titanium oxide, zirconium silicate, silica, zirconium oxide, silicon nitride, magnesium oxide, zinc fluorosilicate, magnesium fluorosilicate, zinc silicate, barium orthotitanate, aluminum fluorosilicate, zirconium orthotitanate, aluminum silicate, aluminum orthotitanate, or mixtures thereof.

11. The method of claim 2 wherein the coating is deposited by the substeps of:
   (a) mixing a fine powder of the filler in a suitable solvent;
   (b) blending the powder-solvent mixture with polymer precursors to form a viscous fluid;
   (c) applying the fluid to the surface to form a film; and
   (d) curing the polymer precursors to form a composite.

12. The method of claim 2 wherein the coating is deposited by the substeps of:
   (a) blending the filler with polymer precursors to form a viscous fluid;
   (b) applying the fluid to the surface to form a film; and (c) curing the polymer precursors to form a composite.

13. The method of claim 1 wherein the coating is deposited by the substeps of:
   (a) forming a sheet of thermal control material; and
   (b) bonding the sheet to the surface.

14. The method of claim 2 wherein the coating is deposited by the substeps of:
   (a) forming a composite sheet of thermal control material containing the filler and polymer; and
   (b) bonding the composite sheet to the surface.

15. The method of claim 11 further comprising the substep of incorporating a suitable amount of a polymerization initiator in the fluid to facilitate curing.

16. The coating of claim 11 wherein the solvent is selected from the group consisting of toluene, hexane, benzene, acetone, methyl ethyl ketone, and mixtures thereof.

17. The method of claim 15 wherein the initiator is selected from the group consisting of conventional organic free radical initiators, organometallics oxime catalysts, and platinum salts.

18. The method of claim 2, wherein the coating is deposited by the substeps of:
   (a) applying the filler to the surface to form a thin, porous layer;
   (b) spraying polymer precursors onto the layer; and
   (c) curing the precursors to form a polymer adhered to the surface, the polymer and filler forming a composite during the curing substep.

19. The method of claim 2 wherein the coating includes a fluorosilicone selected from the group consisting of:

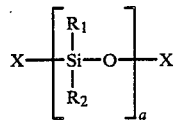

wherein
$R_1$ and $R_2$ are —$CH_3$, —F, —$CF_3$,
—$CH_2(CF_2)_n CH_3$,
—$CH_2(CF_2)_n CF_3$,
—$CH_2(CH_2)_n CF_3$, —CH—$(CF_3)_2$,
—$C_2H_4(CF_2)_e CF_m H_{3-m}$,
—C—$(CF_3)_3$,

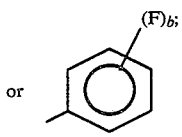

a = about 10–1000;
n = 0–10;
b = 0–5;
x =

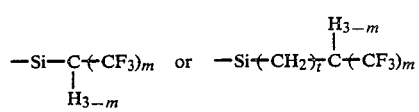

m = 0–3;
t = 0–6; and
e = 0–20 provided that the fluorosilicone includes fluorine.

20. The method of claim 2 wherein the coating includes a fluorophosphazene selected from the group consisting of:

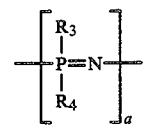

$R_3$ and $R_4$ = —O—$(CH_2)_k (CF_2)_i CF_m H_{3-m}$,

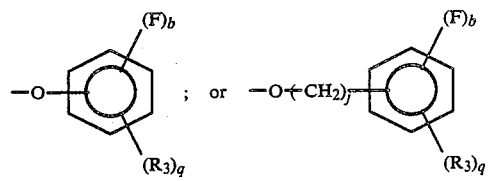

wherein
k = 0–10;
i = 0–10;
j = 1–5;
m = 0–3;
b = 0–5; and
q = 0 through (5-b).

21. The method of claim 3 further comprising a filler mixed into the coating to form a polymer composite.

22. A method for improving the resistance of exposed surfaces to degradation by atomic oxygen, by UV radiation, or a combination thereof comprising the steps of:
   (a) mixing a fine powder of a filler in a solvent;
   (b) blending the powder-solvent mixture with polymer precursors suitable for polymerizing into polymers selected from the group consisting of fluorosilicones, fluorophosphazenes, or copolymers thereof, wherein the fluorosilicones include polymers having the general formula:

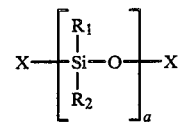

wherein:
$R_1$ and $R_2$ are —$CH_3$, —F, —$CF_3$,
—$CH_2(CH_2)_n CF_3$,
—$CH_2(CF_2)_n CF_3$, —CF—$(CF_3)_2$,
—C—$(CF_3)_3$,
—$CH_2(CH_2)_n CF_3$,
—$C_2H_4(CF_2)_e CF_m H_{3-m}$, or

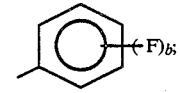

a = about 10–1000;
b = 0–5;
n = 0–10;
x =

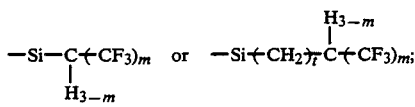

$m = 0-3$;
$t = 0-6$; and
$e = 0-20$ provided that the fluorosilicone includes fluorine.

and wherein the fluorophosphazenes have the general formula:

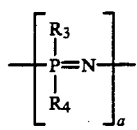

wherein $R_3$ and $R_4$ are $-O-(CH_2)_k(CF_2)_T CF_m H_{3-m}$,

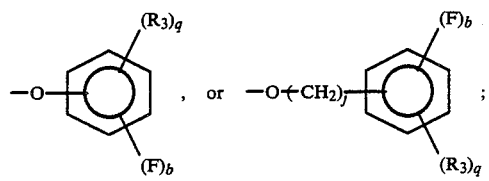

$k = 0-10$;
$i = 0-10$;
$m = 0-3$;
$j = 1-5$;
$b = 0-5$; and
$q = 0$ through $(5-b)$ To form a viscous fluid;
(c) applying the fluid to the surface to form a film; and
(d) curing the polymer precursors to form a composite.

23. A method for depositing a thermal control coating on a surface to provide improved resistance to atomic oxygen and UV radiation, comprising applying to the surface a mixture of a filler compound selected from the group consisting of zinc oxide, barium fluorosilicate, zinc orthotitanate, barium silicate, aluminum oxide, zirconium fluorosilicate, titanium oxide, zirconium silicate, silica, zirconium oxide, silicon nitride, magnesium oxide, zinc fluorosilicate, magnesium fluorosilicate, zinc silicate, barium orthotitanate, aluminum fluorosilicate, zirconium orthotitanate, aluminum silicate, aluminum orthotitanate, and mixtures thereof, with a sufficient amount of polymeric binder precursors, curable to form a fluorosilicone, a fluorophosphazene, or a fluorosilicone—fluorophosphazene copolymer, the precursors allowing the filler to be spread on the surface and to adhere to the surface upon curing and polymerization of the precursors.

* * * * *